Oct. 5, 1926.
C. B. SPALSBURY
1,602,368
PROCESS OF SHOE MANUFACTURE
Filed July 7, 1925     4 Sheets-Sheet 1
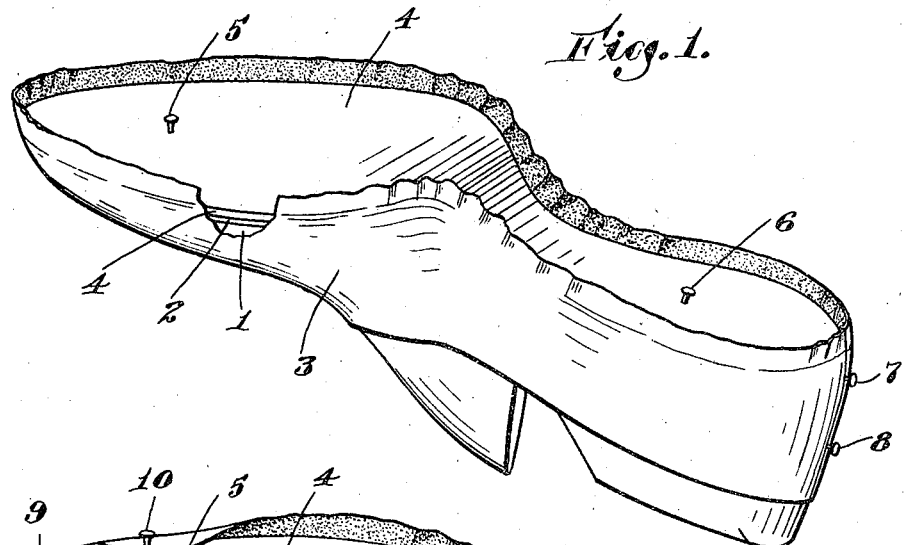
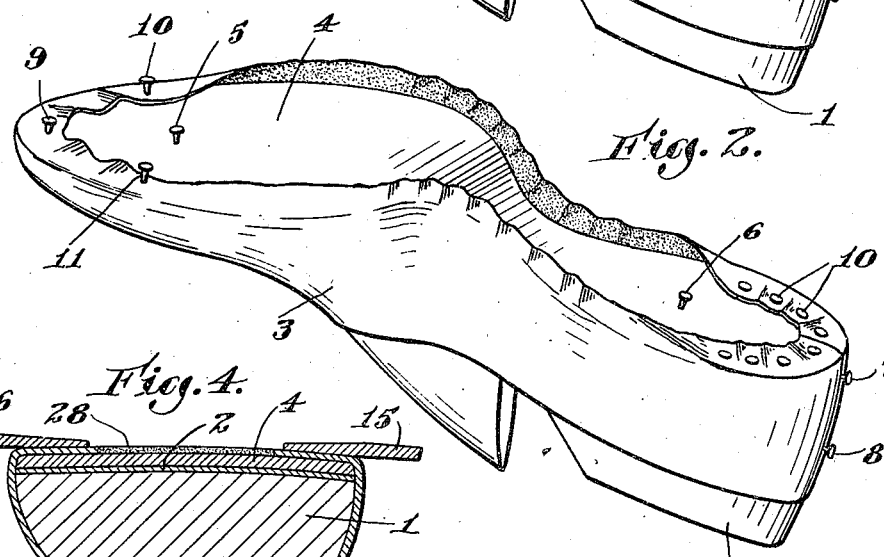
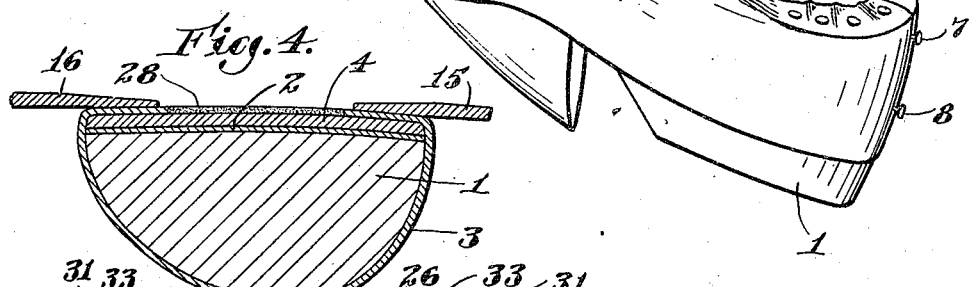
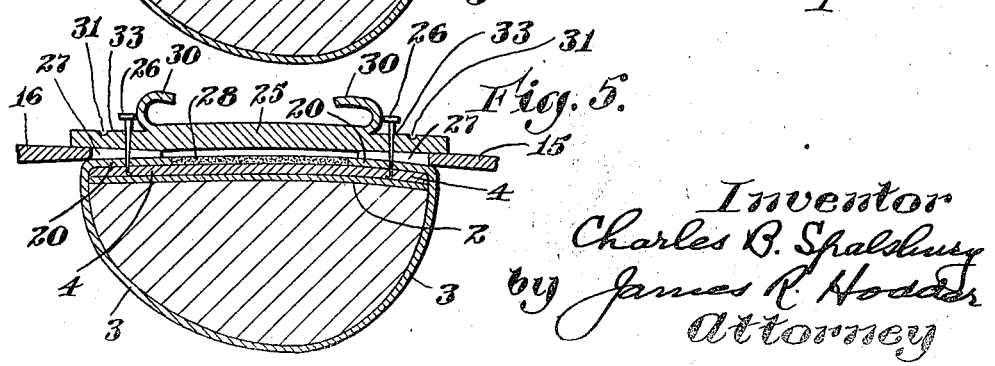
Inventor
Charles B. Spalsbury
by James R. Hodder
Attorney Oct. 5, 1926. 1,602,368
C. B. SPALSBURY
PROCESS OF SHOE MANUFACTURE
Filed July 7, 1925 4 Sheets-Sheet 2
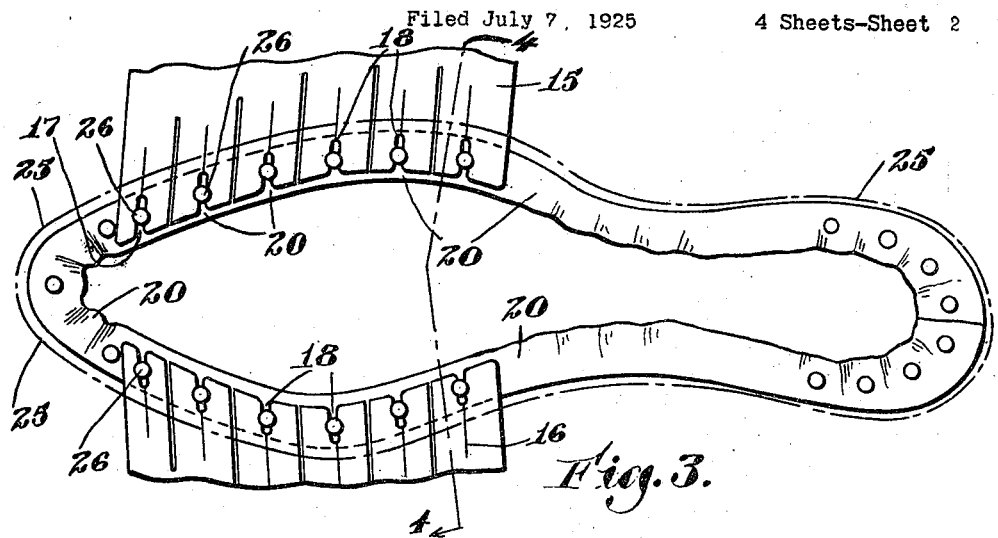
Fig. 3.
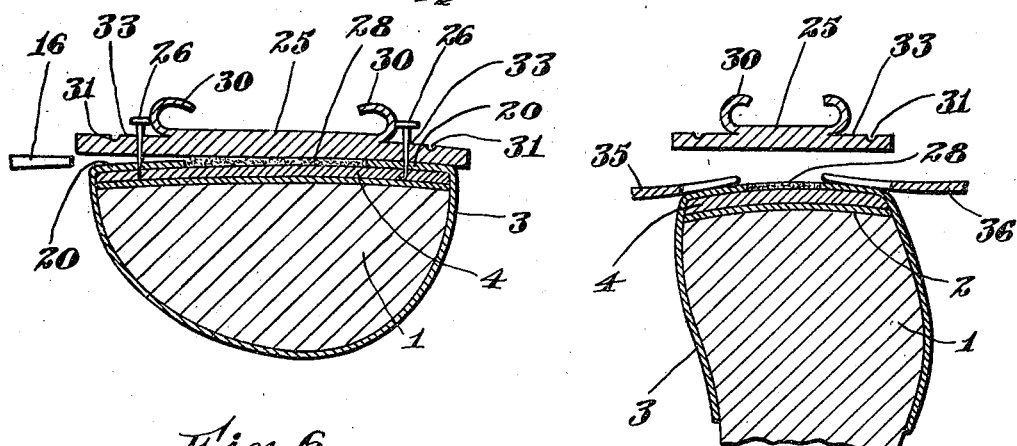
Fig. 6.
Fig. 9.
Inventor
Charles B. Spalsbury
by James R. Hodder
Attorney Oct. 5, 1926.

C. B. SPALSBURY 1,602,368

PROCESS OF SHOE MANUFACTURE

Filed July 7, 1925

Inventor
Charles B. Spalsbury
by James R. Hodder
Attorney

Oct. 5, 1926.
C. B. SPALSBURY
1,602,368
PROCESS OF SHOE MANUFACTURE
Filed July 7, 1925    4 Sheets-Sheet 4
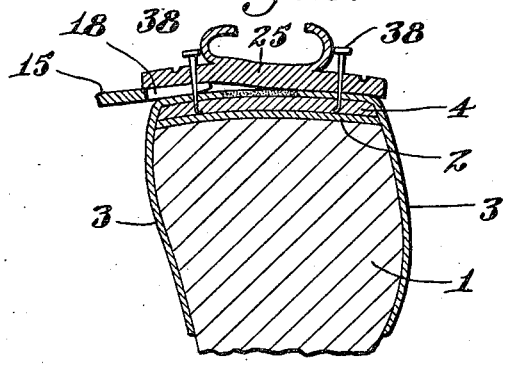
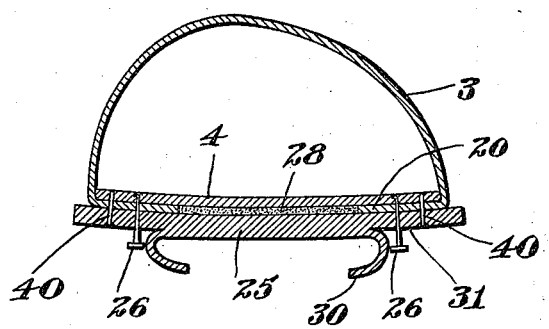
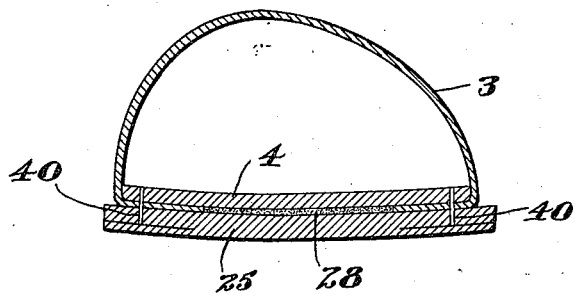
Inventor
Charles B. Spalsbury
by James R. Hodder
Attorney Patented Oct. 5, 1926.

1,602,368

UNITED STATES PATENT OFFICE.

CHARLES B. SPALSBURY, OF ST. LOUIS, MISSOURI, ASSIGNOR TO JOHNSON, STEPHENS & SHINKLE SHOE COMPANY, OF ST. LOUIS, MISSOURI, A CORPORATION OF MISSOURI.

PROCESS OF SHOE MANUFACTURE.

Application filed July 7, 1925. Serial No. 41,998.

My present invention is an improved method or process of manufacturing boots and shoes, and is directed primarily to the improvement in the art of manufacturing shoes employing an insole, outsole, and through and through stitching. More particularly my present invention is directed to the production of an improved shoe, wherein all metallic fasteners, tacks, staples, clamps, adhesives, or the like holding devices, are eliminated from along the forepart and shank of the resulting shoe structure.

Important features of the present invention include a novel outsole, preferably such as is shown, described and claimed in my co-pending application, Ser. No. 5117, filed January 27, 1925. I also utilize novel lasting methods and devices in carrying out my present process, these lasting devices being employed for the operation of working the upper materials over the insole and holding the same when in lasted position during the application of the outsole and the removable lasting tacks or other temporary holding devices. A preferred lasting method and devices therefor are substantially shown in my prior copending application, Ser. No. 630,131, filed April 5th, 1923, and Ser. No. 662,578, filed Sept. 13, 1923, and Ser. No. 710,556, filed May 2, 1924.

A further important and novel feature in carrying out my present process, consists in the step of holding the lasted upper and insole by means of lasting tacks or the like, applied through the outsole, and furthermore applied from the outer surface or bottom side of the outsole, being partially driven in, in order to be removable from the shoe after the outsole upper, and insole have been permanently united by "through and through" or McKay stitching. My novel method of thus applying removable lasting tacks or other holding devices from the outer side of the outsole, particularly in McKay shoe construction, is believed to be a distinct novelty in this art, and I claim the same herein broadly.

A further important feature of my present method consists in the fact of enabling the lasting tacks or holding devices to be driven while the upper materials and insole are held firmly in the final position to which they are stretched by the lasting operation, also applying lasting tacks or other holding devices while the lasting means are still in their extreme lasted position, and while the upper materials and insole are held together under the tension of the lasting devices. Then as the upper materials, leather, lining, etc., are held drawn tightly to the wood of the last on which the shoe is made, and while the same are held under the tension of the lasting instrumentalities, my invention enables the temporary lasting tacks to be then driven. However, prior to applying the lasting tacks, I fit and apply an outsole. After the upper is lasted along the fore part, I may then apply a filler and a shank stiffener, and thereupon the outsole is applied, the lasting devices during all this time holding the upper under tension. Thereupon the lasting tacks are driven through the outsole, upper and insole, along the sides of the forepart. Thereafter, the shank portion of the shoe is similarly lasted, and while this shank portion is also held under the tension of the lasting devices, the lasting tacks may be driven through the outsole, upper materials and insole along each side of the shank of the shoe.

All lasting tacks, staples, or holding devices which are thus driven, are readily removable from outside of the outsole, and remain in the shoe only long enough to hold the upper, insole and outsole in lasted position until the last is "pulled" or withdrawn and the "through and through" or McKay stitching, applied, which permanently unites the upper and insole to the outsole. Thereupon the lasting tacks are withdrawn, either before the shoe is re-lasted, or afterward. This feature is also a distinct novelty and I wish to claim the same herein broadly.

A further step in the preferred form of carrying out my process consists in the applying of all removable lasting tacks along each side of the forepart, as well as along the shank portion, in a position disalined from the line of stitching, preferably these tacks are set inside or toward the center of the sole from the line of stitching intended to be applied, thus permitting the stitching to be run closer to the edge than if any tacks were outside or near the marginal edge of the outsole and insole.

For the purpose of lasting boots and shoes by my present method, I prefer to employ side lasting plates or wipers, and with provision for yielding engagement upon the upper materials, said plates to be slotted or recessed to permit the driving of lasting tacks through the slotted or recessed portions while the lasting devices hold the upper under tension, as above explained. This feature I have shown and described in certain of my prior copending applications, above identified, and the same is claimed in said applications.

The complete process as at present employed by me in preferred form will now be described.

First: The upper materials of usual form, style, size and pattern are assembled upon a last, together with an insole, either by hand or by an assembling machine. Thereupon the assembled upper and insole are preferably subjected to the usual pulling over operation, and a plurality of "stay" tacks are applied, which are subsequently removed. Thereafter I may last the heel seat, and if desired the extreme toe portion, driving in permanently clinched lasting tacks. Preferably I may last the toe portion and hold the same by suitable adhesive until the outsole is applied, or I may utilize the method and toe lasting devices shown in my said prior application Ser. No. 510,555.

With the shoe, upper and insole thus prepared, my novel steps are utilized: The shoe on its last is placed in my novel type of side lasting machine; the lasting operation lasting the fore part is performed by the manipulation of the slotted wipers under tension stretching the upper material tightly about the last and holding the same then under tension until the outsole and temporary lasting tacks are applied. Before applying the outsole a filler piece and shank fastener may be fitted if desired. Thereupon the outsole is applied and the removable lasting tacks are driven from the outside or bottom of the outsole and through the slots in the wipers as above explained. Then the lasting wipers are released and withdrawn, and the operator forces the outsole down snugly against the lasted upper on the insole along the margin to close the outsole tightly against the insole and upper materials the slight space caused by the width and thickness of the lasting wipers. This can be effected in any desired manner and preferably is quickly and easily done by the operator as he inspects the shoe, applying pressure to the margin of the outsole along the shank of the lasting tacks by means of a tack lifter or other device.

The next step in my process consists in lasting the shank portion in a similar manner and by a substantially similar machine with lasting wipers of suitable contour for the shank. Prior to this shank lasting, or subsequent thereto, a metallic or other shank stiffener can be applied, if it has not been previously fitted to the shoe. The shank portion of the outsole is then secured to the upper and insole by driving removable lasting tacks therethrough and in a position disalined from the line of stitching, in substantially the same manner as that practiced in lasting the forepart. The shank lasting wipers are then withdrawn, and the marginal edge of the outsole snugly pressed against the insole to take up the space of the shank lasting wipers.

The shoe is now completely lasted and furthermore has the outsole already secured to the insole and upper by the removable lasting tacks holding the entire shoe structure together with ample strength to permit the withdrawal of the last and the application of through and through stitching. The last is then withdrawn with the lasting tacks still in the shoe and projecting from the outer surface of the outsole, and these tacks being disalined from the line of stitching, which stitching is preferably set in a groove in the outsole, the through and through or so-called McKay stitching is applied without displacing or removing the tacks. After the stitching is thus applied, the shoe is re-lasted, and thereupon I preferably remove the lasting tacks from around the forepart and the shank, thus leaving the forepart and shank portion of my improved shoe entirely free of tacks, clamps, adhesives, or any other auxiliary fastening left permanently within those portions of the shoe structure, as has been customary and necessary in prior methods of manufacture, employing through and through stitching.

While I prefer to utilize the slotted type of lasting wipers, so that the temporary lasting tacks can be driven therethrough, it is equally feasible to drive the lasting tacks beyond the edge of the wipers, or to slightly withdraw the wipers just before tacking, but still holding the upper under tension. These or substantially equivalent alternatives or modifications are intended to be included in certain of the broader claims herein.

Referring to the drawings, illustrating the preferred method of carrying out my present invention, Fig. 1 is an approximate perspective view of an assembled upper and insole on a last;

Fig. 2 is a corresponding perspective view illustrating the pulling over and temporarily securing of the toe portion of the upper and insole;

Fig. 3 is a plan view illustrating my step of lasting the forepart;

Figure 7:
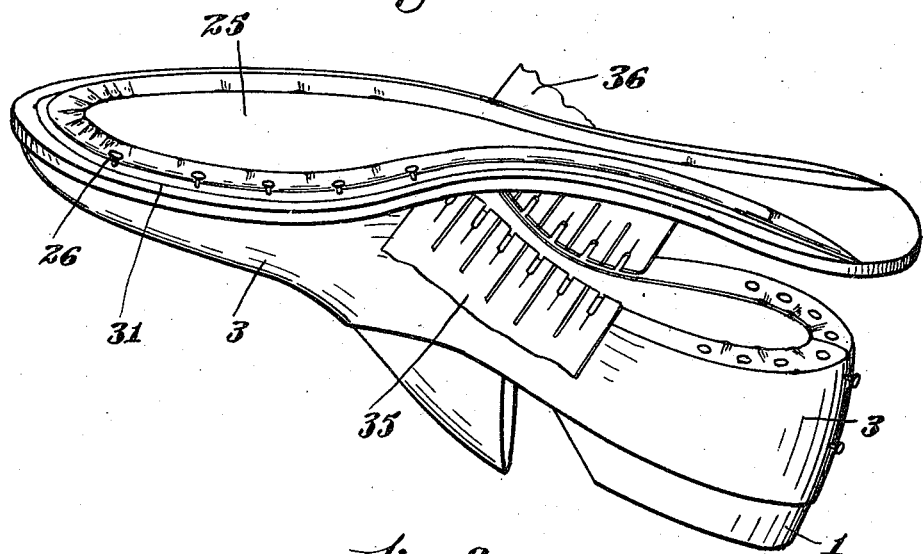
Figure 8:
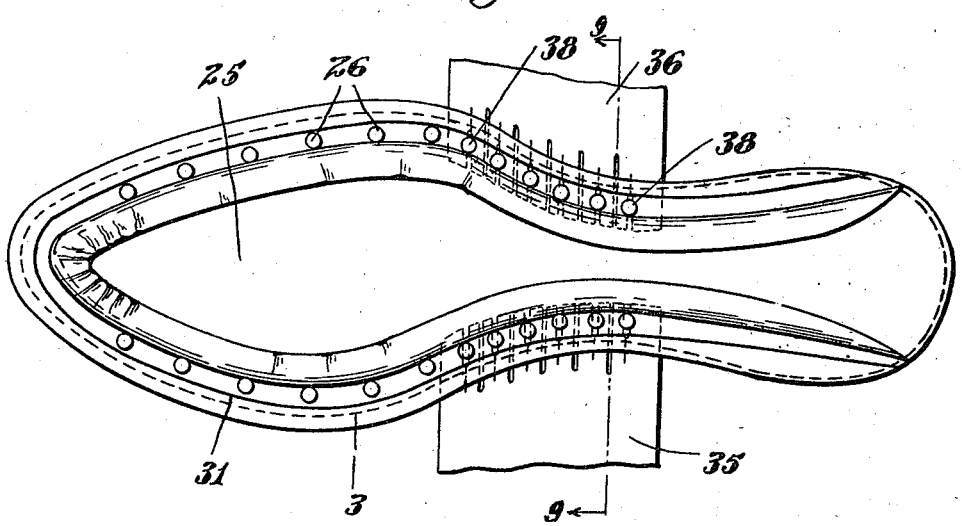

Fig. 4 being a corresponding cross sectional view on the line 4—4 of Fig. 3;

Fig. 5 is a similar cross sectional view to that shown in Fig. 4, but with the outsole applied and the lasting tacks or equivalent temporary holding devices securing the lasted upper in position;

Fig. 6 is a corresponding cross sectional view to Figs. 4 and 5 showing the withdrawing of the lasting wipers and the "snugging down" of the outsole along the shanks of the temporary lasting tacks, to force the outsole, lasted upper and insole firmly in union and to displace the spaces left by withdrawing the lasting wipers;

Fig. 7 is a perspective showing the forepart lasted, the shank and heel portion of the outsole turned upwardly, and the shank lasting wipers partly in position;

Fig. 8 is a plan view of the shank lasting step;

Fig. 9 being a cross-sectional view on the line 9—9 of Fig. 8;

Fig. 10 is a similar cross-sectional view to that shown in Fig. 8, with the outsole applied, the lasting tacks partially driven in, with the lasting wiper on one side being shown in position, and on the other side withdrawn and the outside "snugged down";

Fig. 11 is a cross-sectional view through the forepart, showing the shoe withdrawn from the last and the through and through stitching applied;

Fig. 12 is a corresponding cross-sectional view illustrating the lasting tacks withdrawn and the sole attaching process completed.

Referring to the drawings, 1 indicates a last, which may be of any suitable form, style, size or standard make, and either hinge, block or other type of last, it being a feature of my invention that no special last is required. Preferably a usual metallic clinching plate 2 is fitted to the last.

3 indicates shoe upper materials, usually comprising the usual leather outer portion and such inner lining as is desired, including also a box toe and counter where required. While in the drawings I show a type of low shoe or oxford, my invention is not of course so limited, but will apply to any type, style or form of shoe, which is or can be made by this process. 4 indicates the usual type of insole used in McKay shoe manufacture, viz, an insole without sewing ribs, without "gemming", without channel lips, or other operations performed thereon. An important feature of my present process is that I utilize a very inexpensive and preferably thin innersole, which indeed may be of leather, or composition, such as leatherboard or the like, requiring sufficient strength to retain, temporarily, the removable lasting tacks, and to hold the permanent through and through stitching. Therefore I can utilize thin and inexpensive stock for the insole of my improved shoe, which could not otherwise be employed. However, a typical grade of so-called McKay insole is preferable in carrying out this process. The upper 3 and insole 4 being assembled on a last, the insole being temporarily held by the usual toe and heel tacks 5 and 6, and the upper by one or more heel tacks 7 and 8, is first subjected to the pulling over operation at the toe, and the heel seat nailing operation at the heel. Fig. 2 illustrates my process and the shoe construction at this stage, these operations being usual and well known and any suitable machines can be employed for the same, preferably the well known type of pulling-over machine, and any heel seat making machine. While I prefer to pull over the toe portion and secure same by usual removable lasting tacks 9, 10 and 11, I may employ a wire lasting, holding or other device if desired. Also, while the usual heel seat nailing is indicated with the tacks 10 driven in and clinched against the plate 2, on the last 1, it will be appreciated that I may employ a sewed heel seat if desired, but the usual methods for the toe and heel operations are preferably employed in carrying out my present process. Thereupon the assembled shoe upper and insole, thus partially lasted, is fitted into a lasting machine, preferably of the type shown in my copending application Ser. No. 710,556, filed May 2, 1924. Thereupon I last the forepart of the shoe, as shown in Fig. 3, by means of side wipers indicated generally at 15 and 16, said wipers having a plurality of tack receiving recesses 17, 17 and 18, 18. The marginal portion of the upper around the forepart, indicated at 20, is thus worked, wiped, or lasted over the edge of the insole, until the lasting action is completed and the upper materials are stretched and fitted snugly about the wood of the last and onto the insole. While the lasting wipers 16 are thus and still held in lasting engagement, the outsole 25 is applied to the forepart, and adjusted and positioned on top of the lasting wipers 15 and 16 and removable lasting tacks 26, 26, are driven through the outsole 25 and through the tack receiving recesses 17, 18, in the lasting plates or fingers 15 and 16, as clearly shown in Fig. 5. These lasting tacks 26 are preferably driven into and through the margin 20 of the upper and into and through the insole 4 to a point flush with the bottom of the last. Before the outsole is applied, a filling material 28 may be fitted in if desired, this being of any suitable substance, such as felt, ground cork. or other desired filling. It is entirely feasible to make my present shoe without the filling 28, as the relatively slight thickness of the margin 20 of the upper scarcely requires a filler, although a filler is desirable to aid in cementing and uniting the insole and outsole. No substantial filling, however, is needed, as no sewing rib or the like is formed, and of course no trimming of the lasted upper is required.

The shoe as thus made is in the position substantially as shown in Fig. 5, wherein the lasted upper is held in lasted position by removable lasting tacks 26 applied through the outsole and into the insole, before the lasting wipers 15 and 16 are withdrawn.

While I prefer to drive these lasting tacks through tack receiving recesses in the lasting plates or fingers, as explained and as above illustrated, it is entirely within the province of my present process to drive the lasting tacks slightly beyond the innermost edge of the lasting fingers, or indeed to slightly withdraw the lasting fingers while still holding the upper in tension, and to then drive the lasting tacks beyond the edge of the slightly or partially withdrawn lasting devices.

I also prefer to prepare the outsole substantially as shown in my copending application Ser. No. 5,117, filed January 27, 1925, wherein a marginal channel is formed and cut, and the leaf turned up, as indicated at 30, together with a stitch receiving groove 31, thus forming a tack receiving rim 33 around the marginal edge of the outsole. This arrangement is desirable as the stitching is concealed after the completion of the shoe, and the tack receiving rim gives a desirable location for the removable tacks 26, which are preferably driven within or spaced sufficiently from the margin of the shoe, so as to permit the setting of the permanent stitching 40 in a predetermined location, disalined from that of the tack receiving rim 31, and hence with the stitching entirely clear of the last tacks 26, while said lasting tacks are still in position and before removal of the same.

With the outsole 25 thus applied and held in position on the forepart of the shoe, the lasting wipers or fingers 15 and 16 are then withdrawn, and the marginal portion of the outsole is forced downwardly or snugly against the lasted upper, the same moving readily on the shanks of the lasting tacks 26, and without displacing same or without in any way removing or loosening the holding effect of these lasting tacks. This "snugging down" being readily effected by any tool and usually as the operator inspects the shoe, the movement of the outer part of the sole being only the slight distance or space caused by the removal of the thin lasting fingers.

As shown in Fig. 6, that part of the shoe at the right of the figure, is already snugged down, while at the left the lasting finger 16 is removed, illustrating approximately the slight space left between outsole and insole, and which space this snugging operation closes up.

The lasted shoe is now in substantially the position illustrated in Fig. 7, with the forepart attached and the shank and heel portion of the outsole left free. I can perform the shank lasting operation, in substantially a similar manner to that just described in lasting the forepart, wherein shank lasting fingers 35 and 36, similar to 15 and 16 already described, but of different contour appropriate for the shank portion of the work, is performed, and meanwhile the shank and rear part of the outsole 25 is either held upwardly or allowed to extend above the shank and heel of the shoe as shown in Figs. 7 and 9. When the shank lasting has been performed by one or more manipulations of the wipers, the outsole 25 is then moved down into position, and the lasting tacks along the shank 38, 38, are applied, being driven downwardly and through the outsole, and preferably on the tack receiving rim 33, in substantially the same manner as the driving of the lasting tacks 26 through the forepart. Thereupon the lasting wipers on the shank are withdrawn, as shown at Fig. 10, and the outsole snugged down on the shanks of the lasting tacks as above described.

The shoe is now completely lasted, and held in position by the removable lasting tacks 26 and 38, whereupon the last 1 is withdrawn and the shoe thus lasted is stitched on any suitable or desirable shoe sewing machine, which applies through and through stitching, and sets the permanent fastening 40 therein, uniting the insole, upper and outsole, disalined from the lasting tacks and completing the attachment of the upper, insole and outsole. While I prefer to use stitching for this purpose, I can of course employ any through and through fastenings, one of the important characteristics of my process being that after the through and through fastenings 40 have been applied, I can then withdraw the removable lasting tacks 26 and 38, thus providing a shoe free from all tacks or other auxiliary holding devices except at heel and extreme toe portions. By utilizing my process, which enables lasting tacks or equivalent devices to be applied from the outer surface or bottom of the outsole, into and through the lasted upper and the insole, I have devised a construction which thus holds, temporarily, the insole, lasted upper and outsole, all in lasted position and with sufficient strength to withdraw the last and unite the upper and soles by through and through stitching, and thereupon withdraw and remove said lasting tacks or devices.

From the foregoing it will be appreciated that I have produced, through extremely simple processes, and without extra skill, work or complex machines, but rather by utilizing in a novel form and manner, present well known shoe factory methods, a strong, flexible, and comfortable shoe having through and through fastenings. By driving my removable lasting tacks through the outsole, I have eliminated the former step of clinching lasting tacks, which necessarily left these tacks in the shoe, around forepart and shank, which clinching operation was thought to be necessary in order to hold the lasted upper and insole together while a last was withdrawn and the through and through stitching applied. Besides my process permits the outsole to be permanently attached, and to thus remain, and in fact to permit relasting of the sewed shoe before the lasting tacks are withdrawn. The very important feature of applying through and through fastenings, which may be typical McKay shoe stitching, uniting the outsole, upper and insole, while removable lasting devices or tacks are still in position, and with the last removed, is a fundamental feature. While I prefer to remove all lasting tacks along forepart and shank, and may as above explained, remove those lasting tacks at the toe, if desired, I prefer to have the toe portion secured either by several which can be left therein, or by a suitable adhesive, cement or the like, the function of such adhesive being simply to retain this portion of the lasted upper and insole together, while the through and through stitching is applied. As there is but slight distorting strain at the toe while the last is removed, and as the tacks throughout the rest of the forepart, as well as the shank, retain the lasted shoe together, I find that adhesive is perfectly feasible to thus hold the toe portion, until the through and through stitching is applied.

Having thus described my invention, what I claim as new is:

1. The improved method of making boots and shoes, which includes as a step the applying from the outside of the outsole of removable devices to hold the lasted upper, inner, and outsole together, thereafter removing the last, applying through and through fastenings, and thereupon withdrawing the removable devices.

2. The improved method of making shoes employing permanent through and through fatsenings, which consists in assembling upper materials and an insole on a last, lasting the upper, holding the lasted upper while an outsole is positioned, then applying holding devices through the outsole, upper and insole, thereupon removing the last, applying through and through fastenings, then removing the holding devices, and finishing the shoe in any desired manner.

3. The improved method of making shoes employing permanent through and through fastenings, comprising the following steps of assembling the upper materials and insole on a last, then lasting the heel seat, thence lasting the forepart of the upper by means of lasting wipers, holding said materials under tension of the wipers, then applying an outsole, next applying removable lasting tacks through the outsole, upper, and insole, thereupon removing the wipers, pulling the last, applying through and through fastenings, and thereafter removing the lasting tacks.

4. The improved method of making shoes employing permanent through and through fastening, comprising the following steps of assembling the upper material and insole on a last, then lasting the toe and heel seat, thence lasting the forepart of the upper by means of lasting wipers, holding said upper under tension, then applying an outsole, next applying removable holding tacks through the outsole, upper and insole, thereupon removing the wipers, pulling the last, applying through and through fastenings, and thereafter removing the holding tacks.

5. The improved method of making shoes employing permanent through and through fastenings, comprising the steps of assembling the upper materials and insole on a last, then lasting the heel seat, thence lasting the forepart of the upper by means of lasting wipers, holding said upper under tension, then applying an outsole, next applying removable lasting tacks through the outsole, upper and insole, thereupon removing the wipers, applying pressure to bring into contact the outsole and the upper when the wipers are withdrawn, pulling the last, applying through and through fastenings, and thereafter removing the lasting tacks.

6. The improved method of making shoes with the lasting tacks removed from the forepart and shank, which consists in assembling upper materials and an insole on a last, lasting the upper by movable wipers, holding said upper under tension while an outsole is applied, setting lasting tacks through outsole, upper and insole, then removing the last, applying through and through fastenings, and then withdrawing the lasting tacks.

7. The improved method of making boots and shoes, which includes as a step the process of lasting the upper and an insole on a predetermined portion of the last, applying the outsole to said lasted portion only, then lasting the adjacent portion, then applying the outsole to said adjacent portion, uniting the outsole, lasted upper and insole by temporary holding devices, removing the last and applying permanent through and through fastenings, and removing the holding devices.

8. The improved method of making boots and shoes, which includes as a step the process of lasting the upper and insole on the forepart, applying the outsole to said forepart only, then lasting the shank, then applying the outsole to said shank, temporarily uniting the outsole, lasted upper and insole, removing the last and applying permanent through and through fastenings.

9. The improved process of manufacturing boots and shoes, employing permanent through and through stitching, which comprises the step of holding the lasted upper and insole under tension by temporary holding devices, while an outsole is applied, then driving temporary lasting tacks to unite the outsole, lasted upper and insole, then removing the holding devices and thereupon applying pressure to bring into contact the outsole and lasted upper at the spaces left by removing the said holding devices, thereupon removing the last, applying permanent through and through stitching, and then withdrawing said lasting tacks.

In testimony whereof, I have signed my name to this specification.

CHARLES B. SPALSBURY.